3,347,697
COATED POLYOLEFIN FILM
Thomas Michael Gmitro, Grand Island, N.Y., assignor to E. I. du Pont de Nemours and Company, Wilmington, Del., a corporation of Delaware
Filed Aug. 10, 1965, Ser. No. 478,613
4 Claims. (Cl. 117—46)

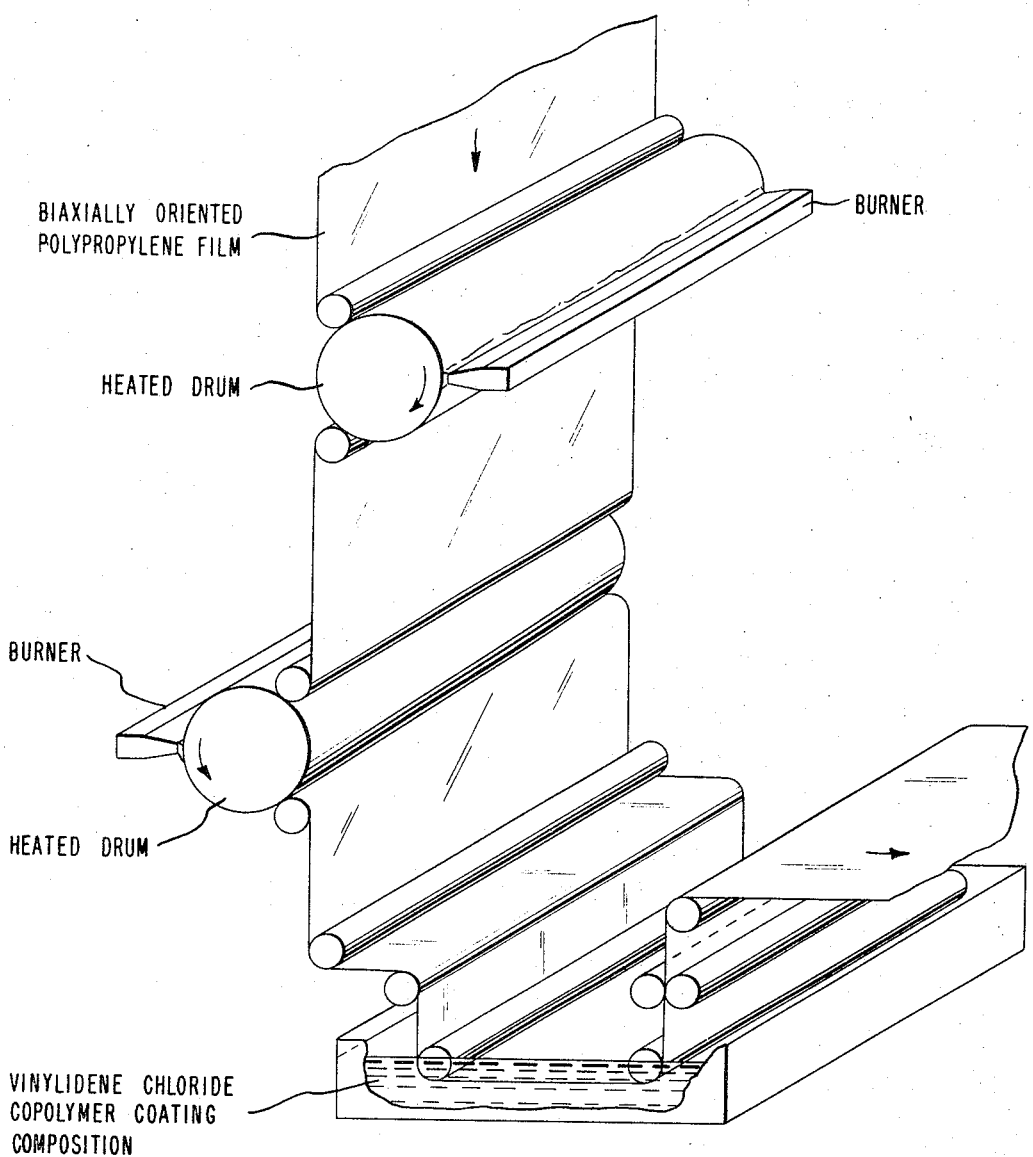

This invention is concerned with polyolefin films and more particularly with vinylidene chloride copolymer-coated, biaxially oriented polypropylene films for general purpose packaging.

In the development of polyolefin film as a general purpose packaging film, it is found that a biaxially oriented polypropylene film coated with the vinylidene chloride copolymer provides a combination of properties, such as heat sealability, protection against permeation of undesired gases, resistance to penetration by greases, etc., which are outstanding for many packaging applications. However, in the adaption of such coated films for the high speed packaging of various food products such as dried vegetables and the like wherein the side seal of the package is made in the form of a lap seam and the top and bottom of the package are sealed by means of a so-called crimp sealer there are found to be deficiencies in the presently available coated polypropylene films. As is observed, when packages are made with a crimp seal from various coated base films there is a tendency for either the coating or the base film to be somewhat damaged by the sharply serrated jaws of this crimp sealer, and while a very neat appearing seal is obtained, it is frequently found that such a seal is of low durability. This becomes manifest when such a packaged product is dropped or is subjected to sudden shock. The packaged product shows a rupture at the point of sealing.

Accordingly, it is an object of this invention to provide a vinylidene chloride copolymer-coated, biaxially oriented polypropylene film suitable for the fabrication of packages requiring both flat bar sealed closures and crimp sealed closures and characterized by high seal durability. The foregoing and related objects will more clearly appear from the description to follow.

These objects are realized by the present invention which, briefly stated, comprises in combination the steps of passing one surface (A) of a continuous biaxially oriented polypropylene film through a flame emanating from the discharge opening of a burner supplied with a gaseous mixture of hydrocarbon fuel and oxygen-enriched air, the fuel equivalence ratio of the gaseous mixture being between 0.95 and 1.10, the oxygen ratio being between 0.25 and 0.30, the surface on which the film is supported as it traverses the flame being, heated and maintained at a temperature between 30° C. and 80° C.; passing the other surface (B) of said film through a flame emanating from the discharge opening of a burner supplied with a gaseous mixture of hydrocarbon fuel and oxygen-enriched air, the fuel equivalence ratio of the gaseous mixture being between 1.15 and 1.30 and at least 0.10 greater than the fuel equivalence ratio of the first named gaseous mixture, the oxygen ratio being between 0.25 and 0.30, the surface on which the film is supported as it traverses the flame being heated and maintained at a temperature between 30° C. and 80° C., the path of the film as it traverses the flame from each burner being located at a distance from the burner less than the length of the unimpeded primary envelope of the flame but not less than the distance below which the velocity of the burning gases escaping from the immediate vicinity of the discharge opening of the burner exceeds the burning velocity of the flame, the exposure of the film to the action of each flame being from a time between 0.0005 and 0.1 second; thereafter coating each side of said film with an aqueous dispersion of a copolymer of vinylidene chloride and at least one ethylenically unsaturated monomer copolymerizable therewith, said copolymer containing between 70 and 95% by weight of vinylidene chloride, and drying said film whereby to produce a biaxially oriented, vinylidene chloride copolymer-coated polypropylene film, one surface (A) of which forms a heat sealed bond to itself of at least 200 grams per inch of width, the opposite surface (B) of which forms a heat sealed bond to itself of between 50 and 100 grams per inch of width, and surface (A) and surface (B) form a heat sealed bond of at least 100 grams per inch of width.

The essential steps of the process of this invention are illustrated schematically in the accompanying drawing.

The expression "fuel equivalence ratio" employed herein in defining the gaseous mixtures supplied to the burner is the ratio of the amount of hydrocarbon fuel present in the gaseous mixture supplied to the burner to the amount of hydrocarbon fuel necessary for complete stoichiometric combustion. The term "stoichiometric" characterizes a proportion of substances (or energy) exactly right or a specific chemical reaction with no excess of any reactant or product.

The expression "oxygen ratio" is the ratio of the total amount of oxygen present in the gaseous mixture supplied to the burner to the total amount of non-fuel components in the mixture, said components including chiefly oxygen and nitrogen.

The "primary envelope" of a stable self-sustaining flame used in carrying out the process of this invention is readily discerned as the luminous pale blue inner portion of the flame nearer the discharge opening of the burner (roughly conical in shape for a circular discharge opening and wedge shaped for a rectangular dischare opening) and is readily distinguished from the fainter less luminous secondary sheet or envelope surrounding it. By "the length of the unimpeded primary envelope" is meant the distance from the discharge opening of the burner to the tip of the primary envelope of the flame when the burner is so positioned that the flame burns freely and the primary envelope is not distorted by impingement on any surface or by the proximate passage of any surface.

An essential feature of this invention is that the film surface which is to be employed as the interior of the package and in face-to-face contact for crimp sealing must be treated before coating with a slightly reducing flame. To insure such a flame, it is required that the fuel equivalence ratio of the gaseous mixture fed to the burner be maintained between about 1.15 and 1.30 preferably between 1.20 and 1.25. For the second surface which is to be coated with a vinylidene chloride copolymer and thereafter employed as the exterior of the package, it is necessary that the flame be essentially neutral in its action. To insure such a flame, it is required that the fuel equivalence ratio of the gaseous mixture be maintained between about 0.95 and 1.10 and preferably between 1.0 and 1.05. The oxygen ratio for both of the treating steps should be maintained within the range of from 0.25 to 0.30 and preferably between 0.27 and 0.29.

While the invention is hereinafter illustrated with propane as the fuel gas for the flame treatment, the process is, of course, operable with other paraffinic and/or olefinic hydrocarbon fuel such as butane, ethane, ethylene and the like or with a mixture of such gases.

The film supporting surface in contact with the surface of the film directly opposite the surface of film undergoing flame treatment should be heated at a temperature within the range of from 30° C. to 80° C. The time during which the film or coated surface is exposed to the action of the flame may vary from as little as 0.0005 of a second to as long as 0.1 of a second.

The copolymers of vinylidene chloride required for purposes of this invention are those containing from 70 to 95% by weight of vinylidene chloride based on the total weight of the polymer and from 5 to 30% by weight of one or more ethylenically unsaturated monomers copolymerizable therewith. A particularly preferred copolymer is one containing from about 78 to 82 parts of vinylidene chloride from about 18 to 22 parts of an alkyl acrylate wherein the alkyl group has from 1 to 3 carbon atoms and from about 3 to 6% of acrylic acid based on the total weight of the vinylidene chloride and the alkyl acrylate. Representative monoolefinic monomers copolymerizable with vinylidene chloride include methyl, ethyl, propyl, isopropyl, isobutyl, butyl, octyl, and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alphachloroacrylate, methyl isopropenylketone, methyl acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropanol acetate, acrylamide, methacrylamide, and alkyl substitution products thereof, phenyl vinyl ketone, diethyl fumarate, diethyl maleate, methylene diethyl maleate, dichlorovinylidene fluoride, dimethyl itaconate, diethyl itaconate, dibutyl itaconate, vinylpyridine, maleic anhydride, aryl glycidyl ether and other unsaturated aliphatic ethers such as those described in U.S.P. 2,160,943.

The vinylidene chloride copolymer coating is preferably applied from an aqueous dispersion of the copolymer containing between 30 and 45% solids. Application may be accomplished by any convenient coating technique to secure a coating having an optimum thickness of about 0.15 mil (i.e., about 6 grams of coating per square meter of film surface).

In the preferred embodiment of this invention the biaxially oriented polypropylene film is one which will show a shrinkage of no greater than 5% when the film is heated without restraint for one minute at 130° C. Preferably surface (A) is given a flame treatment wherein the fuel equivalence ratio of the burner is between 1.0 and 1.05; surface (B) is subjected to a flame treatment with a preferred fuel equivalence ratio between 1.20 and 1.25. The oxygen ratio in both cases is preferably between 0.27 and 0.29. The preferred vinylidene chloride copolymer coating comprises (1) a copolymer of vinylidene chloride obtained from about 78 to 82 parts of vinylidene chloride, from about 18 to 22 parts of an alkyl acrylate wherein the alkyl group is from 1 to 3 carbon atoms and from about 3 to 6% of acrylic acid based on the total weight of said vinylidene chloride and said alkyl acrylate, the copolymer having an intrinsic viscosity within the range of about 1.0 to 2.0 as measured in tetrahydrofuran at 30° C. and (2) a natural occurring wax having a melting point within the range of about 75° C. to 100° C.

The following example will further serve to illustrate the principles and practice, as well as the salient advantages, of this invention.

*Example*

One surface, herein identified as surface A, of a one-mil thick biaxially oriented polypropylene film is subjected to a flame treatment under the following conditions: lip opening of the burner, 200 mils; distance of film from the opening of burner, 3 mm.; length of primary envelope of flame, 4.0 mm.; temperature of the drum over which the film passes, 50° C.; oxygen ratio 0.29; fuel equivalence ratio 1.05; film speed 700 feet per minute.

The opposite surface, herein identified as surface B, of the biaxially oriented polypropylene film is subjected to flame treatment under conditions essentially the same as that described for the first surface except that the fuel equivalence ratio is 1.24.

The film treated as described above is passed at 300 feet per minute through a coating bath of an aqueous dispersion of a vinylidene chloride copolymer, excess dispersion is doctored from the film surface and the film is dried in a coating tower. The dried film bears a coating of approximately 8 grams per square meter. The aqueous dispersion used for coating is 40% solids content and is made from 80 parts of vinylidene chloride, 20 parts methyl acrylate and 4% based by weight of the copolymer of acrylic acid. The dispersion also contains 5% by weight of Carnauba wax, 0.5% by weight of polyvinyl chloride particles (Geon 126[1]) and 2% by weight of Duponol WAQE[2]. Heat seal tests are carried out by sealing strips of the film in a bar dealer at a temperature of 125° C., a pressure of 5 p.s.i., and ¼ second dwell time. Strips sealed with surface A to surface A show values in the range of 240–260 grams per inch of film width; with surface B to surface B, values are in the range of 50 to 85 grams per inch of width; with surface A to surface B, values are in the range of 120 to 160 grams per inch of width.

To evaluate the performance of the film, bags are made up in such a manner that the side seam of the bag represents a lap seam of surface A and surface B. Surface B represents the interior and surface A the exterior surface of the bag. The top and bottom crimp seals of the bag are, of course, made with the surface B being in contact with itself. The bags are filled with 16 oz. of hard jelly candy before sealing and then are submitted to a dropping test wherein each bag is dropped from a height of 20 inches. It is observed that when bags are made wherein the crimp seal is made on the surface treated for adherability with a reducing flame average drop values range from 15 to 30 before failure. Similar bags made from film wherein the adherability of both surfaces was carried out with a flame treatment of a substantially neutral flame showed average values of 2 to 5 drops before failure.

A vinylidene chloride coated regenerated cellulose film made into bags in the same manner as described above shows average values of 40 drops before failure. When bags are made from polypropylene films wherein both surfaces had been given a flame treatment under substantially reducing conditions and the film thereafter was coated with vinylidene chloride copolymer, it is observed that failures occur due to rupture of the side seam of the bag.

It is evident from the foregoing description and example that by a very specific adherability treatment wherein one surface of the film is treated under a somewhat different condition from that of the other there is obtained a coated product having controlled adhesion at each surface, and hence the required combination of properties to give durable heat seal performance when converted into bags lap-seamed at the sides and crimp-sealed at the top and bottom.

What is claimed is:
1. The process which comprises in combination the steps of passing one surface (A) of a continuous biaxially oriented polypropylene film through a flame emanating from the discharge opening of a burner supplied with a gaseous mixture of hydrocarbon fuel and oxygen-enriched air, the fuel equivalence ratio of the gaseous mixture being between 0.95 and 1.10, the oxygen ratio being between 0.25 and 0.30, the surface on which the film is supported as it traverses the flame being heated and maintained at a temperature between 30° C. and 80° C.; passing the other surface (B) of said film through a flame

---
[1] Latex containing particulate polyvinyl chloride—B. F. Goodrich Co.
[2] Sodium salt of fatty alcohol sulfate—Du Pont Co.

emanating from the discharge opening of a burner supplied with a gaseous mixture of hydrocarbon fuel and oxygen-enriched air, the fuel equivalence ratio of the gaseous mixture being between 1.15 and 1.30 and at least 0.10 greater than the fuel equivalence ratio of the first named gaseous mixture, the oxygen ratio being between 0.25 and 0.30, the surface on which the film is supported as it traverses the flame being heated and maintained at a temperature between 30° C. and 80° C., the path of the film as it traverses the flame from each burner being located at a distance from the burner less than the length of the unimpeded primary envelope of the flame but not less than the distance below which the velocity of the burning gases escaping from the immediate vicinity of the discharge opening of the burner exceeds the burning velocity of the flame, the exposure of the film to the action of each flame being from a time between 0.0005 and 0.1 second; thereafter coating each side of said film with an aqueous dispersion of a copolymer of vinylidene chloride and at least one ethylenically unsaturated monomer copolymerizable therewith, said copolymer containing between 70 and 95% by weight of vinylidene chloride, and drying said film.

2. The process of claim 1 wherein the fuel equivalence ratio of the gaseous mixture supplied to the first named burner is between 1.0 and 1.05; the fuel equivalence ratio of the gaseous mixture supplied to the second named burner is between 1.20 and 1.25; and the oxygen ratio for each gaseous mixture is between 0.27 and 0.29.

3. The process of claim 1 wherein said copolymer is a copolymer of vinylidene chloride obtained from about 78 to 82 parts of vinylidene chloride, from about 18 to 22 parts of an alkyl acrylate wherein the alkyl group is from 1 to 3 carbon atoms and from about 3 to 6% of acrylic acid based on the total weight of said vinylidene chloride and said alkyl acrylate, the copolymer having an intrinsic viscosity within the range of about 1.0 to 2.0 as measured in tetrahydrofuran at 30° C.

4. A biaxially oriented, vinylidene chloride copolymer-coated polypropylene film produced in accordance with the process of claim 1.

References Cited

UNITED STATES PATENTS

| | | | |
|---|---|---|---|
| 3,153,683 | 10/1964 | Bryan et al. | 117—46 |
| 3,153,684 | 10/1964 | Bryan et al. | 117—46 |
| 3,248,040 | 4/1966 | Friedman | 117—68 |
| 3,255,034 | 6/1966 | Covington et al. | 117—46 |
| 3,311,491 | 3/1967 | Reichardt et al. | 117—47 |

MURRAY KATZ, *Primary Examiner.*